United States Patent
Takayanagi

(10) Patent No.: US 10,805,541 B2
(45) Date of Patent: Oct. 13, 2020

(54) IMAGE CAPTURE APPARATUS AND CONTROL METHOD THEREOF

(71) Applicant: CANON KABUSHIKI KAISHA, Tokyo (JP)

(72) Inventor: Wataru Takayanagi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/437,514

(22) Filed: Jun. 11, 2019

(65) Prior Publication Data

US 2019/0387170 A1 Dec. 19, 2019

(30) Foreign Application Priority Data

Jun. 13, 2018 (JP) ................................ 2018-113097

(51) Int. Cl.
*H04N 5/232* (2006.01)
*H04N 5/225* (2006.01)
*H04N 5/235* (2006.01)

(52) U.S. Cl.
CPC ....... *H04N 5/23267* (2013.01); *H04N 5/2254* (2013.01); *H04N 5/2353* (2013.01); *H04N 5/23296* (2013.01)

(58) Field of Classification Search
CPC .......... H04N 5/23267; H04N 5/23296; H04N 5/2254; H04N 5/2353; H04N 5/232; H04N 5/23287; H04N 5/23258; H04N 5/23264
See application file for complete search history.

(56) References Cited

U.S. PATENT DOCUMENTS

| | | | |
|---|---|---|---|
| 8,155,512 B2 * | 4/2012 | Honjo | G03B 5/00 348/208.16 |
| 9,692,976 B2 * | 6/2017 | Sakurai | H04N 5/23287 |
| 2015/0281582 A1 * | 10/2015 | Sakurai | H04N 5/23287 348/208.2 |
| 2018/0255223 A1 * | 9/2018 | Ichihara | H04N 5/2327 |
| 2018/0309932 A1 * | 10/2018 | Nadamoto | H04N 5/23254 |
| 2019/0199930 A1 * | 6/2019 | Noguchi | H04N 5/23264 |

FOREIGN PATENT DOCUMENTS

JP 2015-194711 A 11/2015

* cited by examiner

*Primary Examiner* — Nhan T Tran
(74) *Attorney, Agent, or Firm* — Cowan, Liebowitz & Latman, P.C.

(57) ABSTRACT

An image capture apparatus extracts a motion component caused by an operation of a vibration source included in the image capture apparatus, based on output signals of motion detection sensors positioned at different distances from the vibration source. The image capture apparatus then corrects one of the output signals of the motion detection sensors using the motion component and controls image stabilization based on the corrected output signal.

18 Claims, 9 Drawing Sheets

IMAGE CAPTURE APPARATUS AND CONTROL METHOD THEREOF

BACKGROUND OF THE INVENTION

Field of the Invention

The present invention relates to an image capture apparatus and a control method of the image capture apparatus and, more particularly, to image stabilization technology.

Description of the Related Art

Most electronic devices that have an image capture function (hereinafter, such an electronic device is referred to as an "image capture apparatus") have an image stabilization function to correct blurring of an image to be captured caused by motion of the image capture apparatus. There are two types of image stabilization techniques: optical image stabilization and electronic image stabilization. The optical image stabilization reduces image blurring by driving a correction device or member (such as a correction lens or an image sensor) such that the correction device or member cancels out motion of the apparatus. On the other hand, the electronic image stabilization reduces image blurring by moving a cropping area of a captured image such that the position of the cropping area cancels out motion of the apparatus.

Conventionally, the optical image stabilization drives either the correction lens or the image sensor. In recent years, optical image stabilization that drives both the correction lens and the image sensor has been proposed to enhance the correctable range of blurring (see Japanese Patent Laid-Open No. 2015-194711). Moreover, hybrid image stabilization combining optical and electronic image stabilization is also known.

To increase the accuracy of image stabilization, increasing the accuracy of detection of motion caused by hand shake is required. However, the accuracy of detection of motion caused by hand shake has been decreased due to motion of the apparatus caused by a vibration source that resides in the apparatus, such as a front curtain of a mechanical shutter.

The present invention provides an image capture apparatus that is capable of alleviating decrease in the accuracy of image stabilization due to a vibration source of the image capture apparatus, and a control method of the image capture apparatus.

SUMMARY OF THE INVENTION

According to one aspect of the present invention, there is provided an image capture apparatus comprising: first motion detection sensor for outputting a signal corresponding to detected motion; and at least one processor or circuit which functions as: a generation unit configured to extract a motion component caused by an operation of a vibration source included in the image capture apparatus, based on an output signal of the first motion detection sensor and an output signal of second motion detection sensor, the first motion detection sensor and the second motion detection sensor being at different distances from the vibration source; a signal correction unit configured to correct the output signal of the first motion detection sensor using the motion component; and an image stabilization control unit configured to control image stabilization based on the output signal corrected by the signal correction unit.

According to another aspect of the present invention, there is provided a control method of an image capture apparatus, the method comprising: acquiring a signal corresponding to motion, from first motion detection sensor; acquiring a signal corresponding to motion, from second motion detection sensor, the first motion detection sensor and the second motion detection sensor being at different distances from a vibration source included in the image capture apparatus; extracting a motion component caused by an operation of the vibration source based on the signal acquired from the first motion detection sensor and the signal acquired from the second motion detection sensor; correcting the signal acquired from the first motion detection sensor using the motion component; and controlling image stabilization by driving a correction member based on the signal corrected in the correcting.

According to still another aspect of the present invention, there is provided a non-transitory computer-readable medium storing one or more programs executable by one or more processors of an image capture apparatus, wherein the one or more programs, when executed by the one or more processors, cause the one or more processors to function as to perform a control method of an image capture apparatus comprising: acquiring a signal corresponding to motion, from first motion detection sensor; acquiring a signal corresponding to motion, from second motion detection sensor, the first motion detection sensor and the second motion detection sensor being at different distances from a vibration source included in the image capture apparatus; extracting a motion component caused by an operation of the vibration source based on the signal acquired from the first motion detection sensor and the signal acquired from the second motion detection sensor; correcting the signal acquired from the first motion detection sensor using the motion component; and controlling image stabilization by driving a correction member based on the signal corrected in the correcting.

Further features of the present invention will be apparent from the following description of exemplary embodiments with reference to the attached drawings.

DESCRIPTION OF THE EMBODIMENTS

Figure 1:
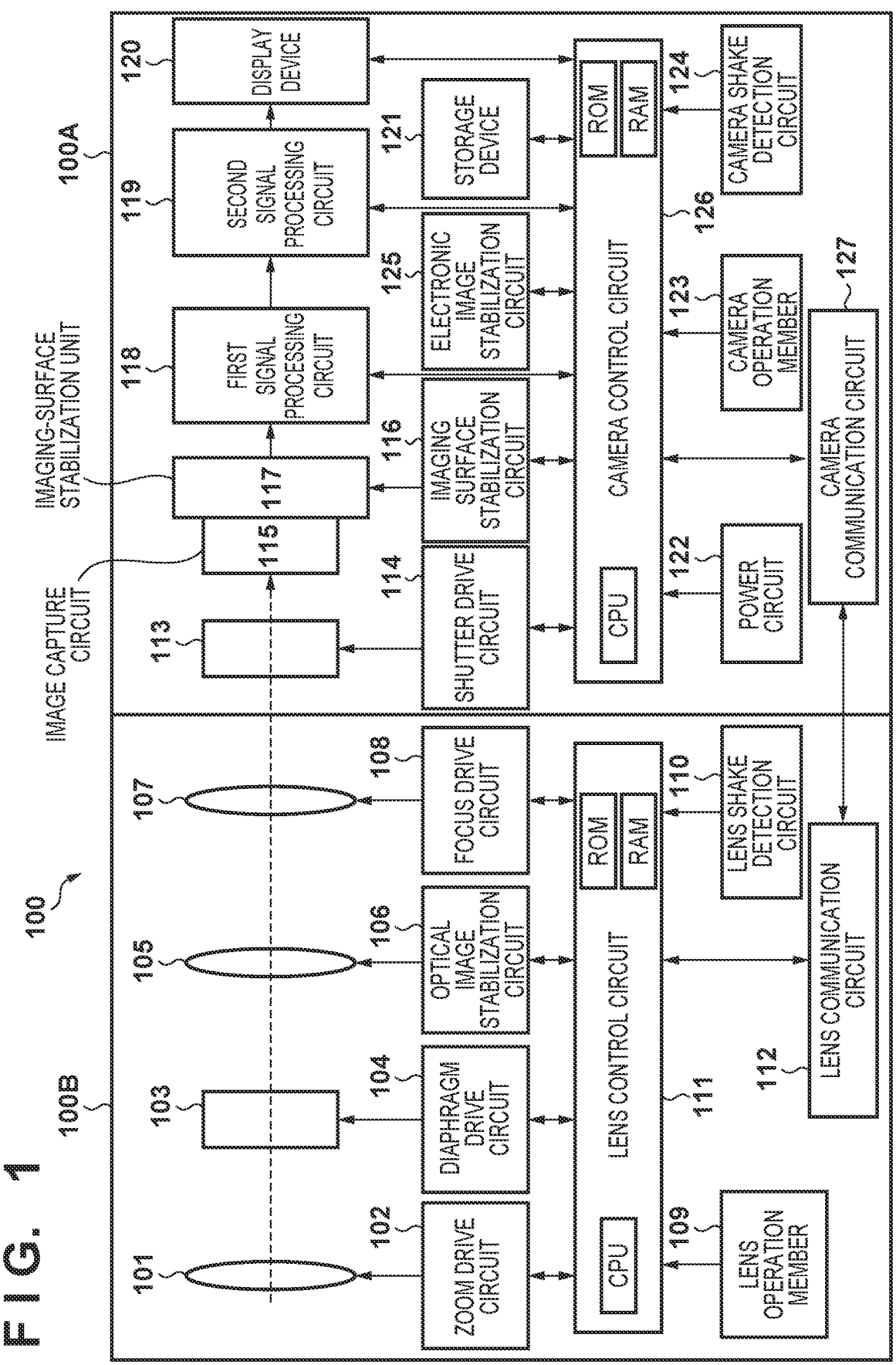
FIG. 1 is a block diagram illustrating an exemplary functional configuration of a digital camera according to an embodiment.

Exemplary embodiments of the present invention will now be described in detail in accordance with the accompanying drawings. It should be noted that the present invention is not limited to the exemplary embodiments described below. Thus, structural components described in the exemplary embodiments are not integral to the present invention. Any structural component illustrated as a functional block in the drawing can be implemented as hardware, software, or a combination of both. One functional block may be implemented by a plurality of hardware components. One hardware component may implement a plurality of functional blocks. One or more functional blocks may be implemented by at least one programmable processor (such as a CPU or a micro processing unit (MPU)) executing a computer program loaded into memory. A hardware component implementing at least one functional block can be realized by an integrated circuit, such as a discrete circuit, a field programmable gate array (FPGA), or an application specific integrated circuit (ASIC).

The following describes a configuration applying the present invention to an interchangeable lens digital camera, which is an example of an image capture apparatus according to the present invention. However, the present invention is applicable to any image capture apparatus (any electronic device having an image capture function) capable of detecting motion of the apparatus at multiple positions. Such apparatuses may include, but are not limited to, personal computers, smartphones, tablet terminals, and game machines.

FIG. 1 is a block diagram illustrating an exemplary functional configuration of an interchangeable lens digital camera 100 that has a detachable lens unit 100B attached to a camera body 100A. Hereinafter, the configuration in which the lens unit 100B is attached to the camera body 100A may also be referred to as an image capture system.

A zoom unit 101 of the lens unit 100B is a movable unit that changes the focal length (an angle of view) of the lens unit 100B. A zoom drive circuit 102 drives the zoom unit 101 in response to an instruction from a lens control circuit 111. A diaphragm drive circuit 104 drives a diaphragm unit 103 in response to an instruction from the lens control circuit 111. An image stabilization unit 105 includes a movable lens for image stabilization (this lens is referred to as a "correction lens"). An optical image stabilization circuit 106 drives the correction lens in response to an instruction from the lens control circuit 111. A focus unit 107 includes a movable lens for adjusting the focal length of the lens unit 100B (this lens is referred to as a "focus lens"). A focus drive circuit 108 drives the focus lens in response to an instruction from the lens control circuit 111.

A lens operation member 109 is used by a user to operate the lens unit 100B (to set manual zoom, manual focus, an aperture value, or an operation mode, for example). Operation of and the status of the lens operation member 109 is detected by the lens control circuit 111. A lens communication circuit 112 communicates with a camera communication circuit 127 included in the camera body 100A, via a contact point at mount portions of the lens unit 100B and the camera body 100A.

A lens shake detection circuit 110 is fixed to the lens unit 100B and outputs a detection signal indicating motion to the lens control circuit 111. The lens shake detection circuit 110 includes, for example, a gyroscope sensor (i.e., the second motion detection sensor) that outputs a signal that corresponds to angular velocity for each of three mutually perpendicular axes. Moreover, the lens shake detection circuit 110 may also include a circuit for correcting an offset component contained in the output from the gyroscope sensor and a circuit for adjusting gain.

The lens control circuit 111 includes a programmable processor such as a CPU, and also includes a ROM and a RAM. The lens control circuit 111 implements an operation of the lens unit 100B by loading a program stored in the ROM to the RAM and causing the programmable processor to execute this program. To be more specific, the lens control circuit 111 controls operations of the aforementioned circuits 102, 104, 106, 108, and 112 in response to operation of the lens operation member 109 or an instruction received from a camera control circuit 126 via the lens communication circuit 112. The lens control circuit 111 performs analog-to-digital (A/D) conversion on output signals of the lens shake detection circuit 110 and then stores the converted signals in the RAM. The lens control circuit 111 processes each sample of the signal obtained by the A/D conversion.

Next, the camera body 100A will be described. A shutter unit 113 is a focal-plane shutter (a mechanical shutter) that has front and rear curtains. The front curtain of the mechanical shutter is an example of a vibration source located in the camera body 100A. A shutter drive circuit 114 controls charging and running of the mechanical shutter under control by the camera control circuit 126.

An image capture circuit 115 includes an image sensor and a peripheral circuit. The image capture circuit 115 causes a plurality of photoelectric conversion units of the image sensor to convert an optical image formed on an imaging surface by the lens unit 100B into a group of electrical signals, and performs A/D conversion to convert the signals into digital image signals.

An imaging-surface stabilization unit 117 includes an actuator for driving the image sensor of the image capture circuit 115. An imaging-surface stabilization circuit 116 controls operations of the imaging-surface stabilization unit 117 under control by the camera control circuit 126. A first signal processing circuit 118 generates image data by applying predetermined image processing, such as color interpolation, to the digital image signal output from the image capture circuit 115. A second signal processing circuit 119 processes the image data output from the first signal processing circuit 118, depending on an application. For example, the second signal processing circuit 119 crops, from the image data, a range corresponding to the image stabilization amount generated by an electronic image stabilization circuit 125. Moreover, the second signal processing circuit 119 generates display image data and recording image data.

The recording image data is stored in a storage device 121 via the camera control circuit 126. The storage device 121 may be a memory card, for example.

A display device 120 displays the following, for example: an image based on the image data output from the second signal processing circuit 119 or based on the image data read from the storage device 121; information regarding the digital camera 100; set values of the digital camera 100; and a graphical user interface (GUI). The display device 120 may be a touch display, for example.

A power circuit 122 supplies power to the camera body 100A and the lens unit 100B attached to the camera body 100A. A camera operation member 123 is a collective term for a group of input devices used by the user to give instructions to the camera body 100A. The camera operation member 123 includes, for example, a power switch, a shutter button, a menu button, an OK button, arrow keys, and a mode dial. If the display device 120 is a touch display, a touch panel of the display device 120 is included in the camera operation member 123.

The camera control circuit 126 includes a programmable processor such as a CPU, and also includes a ROM and a RAM. The camera control circuit 126 implements operations of the camera body 100A by loading a program stored in the ROM to the RAM and causing the programmable processor to execute this program. To be more specific, the camera control circuit 126 detects operation of the camera operation member 123. Then, to implement an operation corresponding to the detected operation, the camera control circuit 126 controls operations of each functional block of the camera body 100A. Moreover, the camera control circuit 126 communicates with the lens control circuit 111 via the camera communication circuit 127 to control operations of the lens unit 100B as well.

Based on an evaluation value obtained from the image data by the first signal processing circuit 118, the camera control circuit 126 implements automatic focusing (AF) for determining a focus lens position and automatic exposure control (AE) for determining a shooting condition, such as shutter speed. These operations are well known and thus not described in detail here.

A camera shake detection circuit 124 is fixed to the camera body 100A and outputs a signal indicating motion to the camera control circuit 126. The camera shake detection circuit 124 may include, for example, a gyroscope sensor (i.e., the first motion detection sensor) that outputs a signal corresponding to angular velocity for each of three mutually perpendicular axes. Moreover, the camera shake detection circuit 126 may also include a circuit for correcting an offset component contained in the output from the gyroscope sensor and a circuit for adjusting gain. The camera control circuit 126 performs A/D conversion on the output signal of the camera shake detection circuit 124 and then stores this converted signal in the RAM. The camera control circuit 126 processes each sample of the signal obtained by the A/D conversion.

Next, an operation of the digital camera 100 will be described. The camera operation member 123 includes an image stabilization switch for the user to activate (ON) or deactivate (OFF) image stabilization. Moreover, when activating image stabilization, the user can select between a first image stabilization mode and a second image stabilization mode, according to the present embodiment.

The first image stabilization mode is realized by the following: image stabilization using the correction member (the correction lens) of the lens unit 100B (first image stabilization operation); and image stabilization using the correction member (the image sensor) of the camera body 100A (second image stabilization operation). Hereinafter, the first image stabilization operation is referred to as "optical image stabilization", and the second image stabilization operation is referred to as "imaging-surface stabilization".

The second image stabilization mode is realized through using electronic image stabilization (this is a third image stabilization operation) in combination with the first and second image stabilization operations.

Electronic image stabilization is not performed in the first image stabilization mode, and thus an effective area of the image sensor is larger in the first image stabilization mode than in the second image stabilization mode. On this account, the first image stabilization mode can realize image data with a wider angle of view at higher resolution than the second image stabilization mode.

On the other hand, the second image stabilization mode additionally employs electronic image stabilization to correct blurring that cannot be corrected with the first image stabilization mode.

In a shooting standby state where an instruction to record a still image or moving image can be accepted, the camera control circuit 126 allows the display device 120 to function as an electronic viewfinder. In this case, the camera control circuit 126 continuously executes moving image shooting and displays the display moving image data obtained by the second signal processing circuit 119 on the display device 120.

The shutter button of the camera operation member 123 includes a first switch (SW1) that is activated when pressed halfway and a second switch (SW2) that is activated when pressed all the way down. Upon detecting activation of the SW1 during the shooting standby state, the camera control circuit 126 starts a still-image shooting preparation operation including AF and AE. Upon detecting activation of SW2, the camera control circuit 126 executes still-image shooting in accordance with the shooting condition determined by AE and records image data obtained in this shooting.

Upon detecting an operation made on a moving image recording switch of the camera operation member 123 during the shooting standby state, the camera control circuit 126 starts a moving image recording operation. Upon detecting an operation made on the moving image recording switch during the moving image recording operation, the camera control circuit 126 ends the moving image recording operation and returns to the shooting standby state. Upon detecting an operation made on the SW2 during the moving image recording operation, the camera control circuit 126 interrupts the moving image recording operation to start a still-image shooting and recording operation. Then, after the recording has ended, the camera control circuit 126 resumes the moving image shooting and recording operation. Alternatively, without interrupting the moving image recording operation, the camera control circuit 126 may record, as a still image, a shot moving image frame upon detection of operation of the SW2.

When image stabilization is enabled, the camera control circuit 126 is capable of executing image stabilization during shooting of moving images to be displayed on the display device 120 in the shooting standby state as well as during shooting for recording.

The camera operation member 123 further includes a mode selector switch to switch between a shooting mode and a reproduction mode. Upon detecting an operation to select the reproduction mode, the camera control circuit 126 stops the moving image shooting operation and the image stabilization operation, and starts an operation for reproducing the image data stored in the storage device 121.

Detection of Motion Caused by Shutter Operation

Figure 2A:
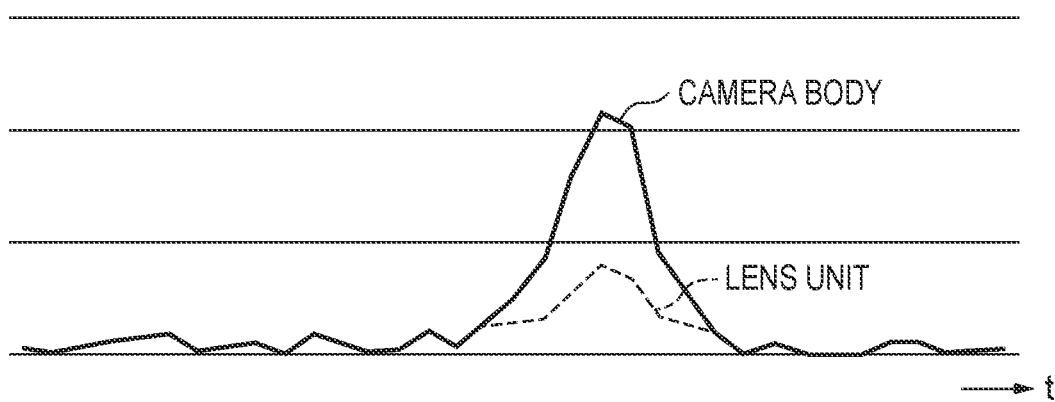
FIG. 2A and FIG. 2B are waveform diagrams of shutter vibration detected by a camera body and a lens unit.

FIG. 2A schematically illustrates temporal changes in motion detected by the camera shake detection circuit 124 (indicated by the solid line) during still-image shooting, and temporal changes in motion detected by the lens shake detection circuit 110 (indicated by the dashed line) during still-image shooting. In FIG. 2A, the horizontal axis represents time and the vertical axis represents magnitude of motion. The focal-plane shutter, which is the vibration source, is located in the camera body 100A. The camera shake detection circuit 124 and the lens shake detection circuit 110 are at different distances from the vibration source. Motion of the digital camera 100 caused by a shock coming from the front curtain of the shutter (referred to as shutter shock) is detected by both the lens shake detection circuit 110 and the camera shake detection circuit 124. However, the magnitudes of motion detected by these circuits are different. This is because the shock generated by the vibration source attenuates during transmission thereof. Thus, the magnitude of motion detected by the camera shake detection circuit 124, which is closer to the vibration source, is higher.

Figure 2B:
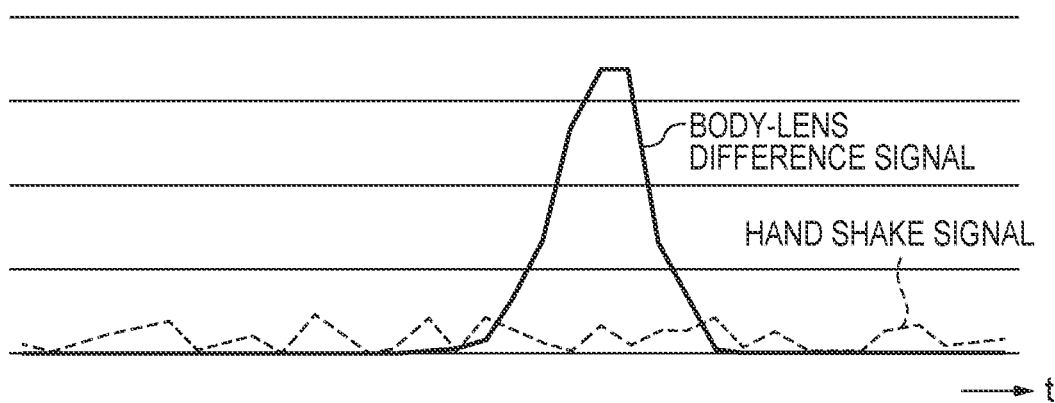

The dashed line in FIG. 2B indicates temporal changes in motion of the digital camera 100 caused by hand shake. Here, FIG. 2A and FIG. 2B have different vertical axis scales, and thus scales of the signal levels shown in FIG. 2A and FIG. 2B are different. The camera shake detection circuit 124 detects a higher magnitude of motion of the digital camera 100 caused by a shutter operation than the lens shake detection circuit 110. On the other hand, motion of the digital camera 100 caused by hand shake is motion of the entire digital camera 100. Thus, the same magnitude of motion of the digital camera 100 caused by hand shake is detected by both the camera shake detection circuit 124 and the lens shake detection circuit 110.

Therefore, by obtaining a difference between the output signal of the camera shake detection circuit 124 and the output signal of the lens shake detection circuit 110, a motion component generated by hand shake can be eliminated, and thus a motion component generated by the shutter operation (a shutter shock component) can be extracted, as indicated by the solid line in FIG. 2B. However, the magnitude of the extracted motion component is reduced due to the difference. For this reason, the level of the shutter shock component is adjusted to the level that is to be originally detected by the camera shake detection circuit 124. Then, this adjusted level is used to correct the output signal of the camera shake detection circuit 124 (i.e., for reducing the shutter shock component). Here, by varying the gain used for the level adjustment, a signal for correcting the output signal of the lens shake detection circuit 110 can also be generated. This principle applies not only to the camera body and the lens unit, but also to any configuration in which the motion of the image capture apparatus is detected at two locations having different distances from the vibration source (the focal-plane shutter in this case).

By subtracting the level-adjusted shutter shock component from at least one of the output signals of the camera shake detection circuit 124 and the lens shake detection circuit 110, respective shake detection units are capable of accurately detecting the motion caused by hand shake. For subtraction performed on the two signals, timings of these signals need to be synchronized. The camera control circuit 126 is capable of synchronizing the timings of the signals in accordance with, for example, a length of time required for communication between the camera body 100A and the lens unit 100B and a rise timing of the waveform. This signal subtraction is executed for each set of samples obtained at the same time of day.

Figure 3:
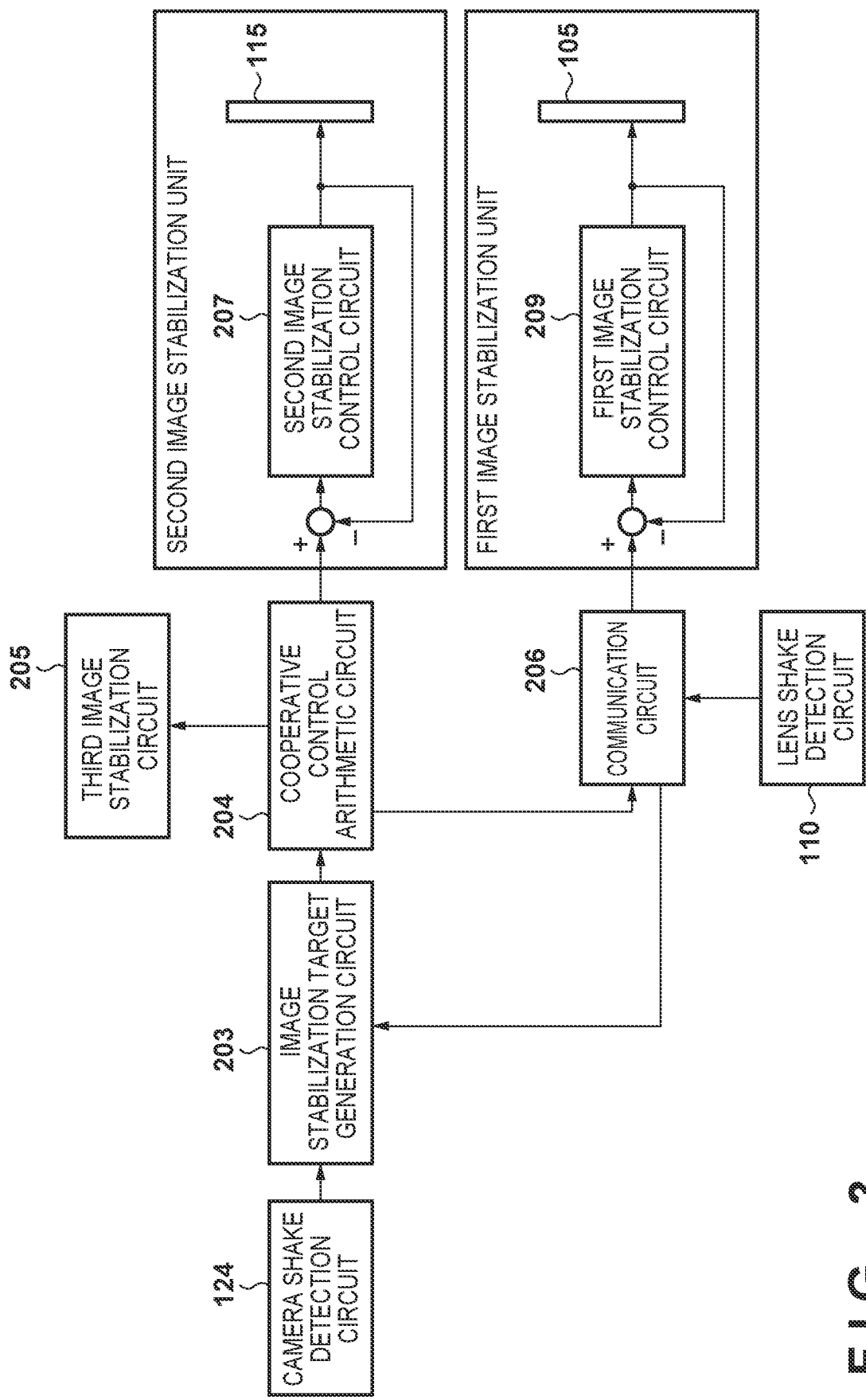
FIG. 3 is a block diagram schematically illustrating functions for realizing cooperative control over a plurality of image stabilization processes.

FIG. 3 is a functional block diagram schematically illustrating the first to third image stabilization operations performed by the digital camera 100 according to the present embodiment.

The output signal of the camera shake detection circuit 124 is input to an image stabilization target generation circuit 203 implemented by the camera control circuit 126.

The image stabilization target generation circuit 203 extracts the shutter shock components from the output signals of the camera shake detection circuit 124 and the lens shake detection circuit 110 to generate correction signals. Moreover, the image stabilization target generation circuit 203 generates target values for magnitude and direction in which correction is to be made, based on the output signal of the camera shake detection circuit 124 corrected using the correction signal. Then, the image stabilization target generation circuit 203 supplies the target values to a cooperative control arithmetic circuit 204.

The cooperative control arithmetic circuit 204 implemented by the camera control circuit 126 generates control values to realize, in the first to third image stabilization operations, the target values generated by the image stabilization target generation circuit 203. The cooperative control arithmetic circuit 204 generates the image stabilization amount (the magnitude and direction of blurring) for each of the first and second image stabilization operations in the first image stabilization mode, and for each of the first to third image stabilization operations in the second image stabilization mode.

The cooperative control arithmetic circuit 204 may generate the aforementioned image stabilization amount according to a well-known method, and thus detailed description is omitted here. For example, the cooperative control arithmetic circuit 204 may generate the image stabilization amount to correct a high-frequency component of blurring by the second image stabilization operation (the optical image stabilization) and correct a low-frequency component by the first image stabilization operation (the imaging-surface stabilization). In the case where the target values can be realized by the first and second image stabilization operations, the cooperative control arithmetic circuit 204 can similarly generate the image stabilization amount in the second image stabilization mode as in the first image stabilization mode. In the case where the target values cannot be realized by the first and second image stabilization operations, the cooperative control arithmetic circuit 204 can generate the image stabilization amount to correct, by the third image stabilization operation (the electronic image stabilization), a part outside the correction ranges of the first and second image stabilization operations. In the case where the target values can be realized by only one of the first and second image stabilization operations, the cooperative control arithmetic circuit 204 may generate the image stabilization amount to execute only one of the image stabilization operations. In the case where only one of the first and second image stabilization operations is executed, the cooperative control arithmetic circuit 204 may prioritize the second image stabilization operation that does not require communication with the lens unit 100B. The cooperative control arithmetic circuit 204 supplies the generated image stabilization amount to the corresponding image stabilization unit.

A first image stabilization unit includes: a first image stabilization control circuit 209 implemented by the lens control circuit 111 and the optical image stabilization circuit 106; and the correction lens. The first image stabilization control circuit 209 communicates with the cooperative control arithmetic circuit 204 via a communication circuit 206. The communication circuit 206 is realized by the camera communication circuit 127 and the lens communication circuit 112.

Upon receiving the image stabilization amount from the cooperative control arithmetic circuit 204 via the communication circuit 206, the first image stabilization control circuit 209 drives the correction lens in accordance with the magnitude and direction indicated by the image stabilization amount. The first image stabilization control circuit 209 repeatedly detects the position of the correction lens and drives the correction lens so as to reduce a difference between the detected position of the correction lens and the target position.

A second image stabilization unit includes: a second image stabilization control circuit 207 implemented by the camera control circuit 126, the imaging-surface stabilization circuit 116, and the imaging-surface stabilization unit 117; and the image sensor of the image capture circuit 115 as a correction member. The second image stabilization control circuit 207 drives the image sensor of the image capture circuit 115 in accordance with the magnitude and direction indicated by the image stabilization amount supplied from the cooperative control arithmetic circuit 204. The second image stabilization control circuit 207 repeatedly detects the position of the image sensor of the image capture circuit 115 and drives the image sensor so as to reduce a difference between the detected position of the image sensor and the target position.

A third image stabilization circuit 205 is implemented by the electronic image stabilization circuit 125 and the second signal processing circuit 119. The third image stabilization circuit 205 determines a region to be cropped in accordance with the image stabilization amount supplied from the cooperative control arithmetic circuit 204. Then, the third image stabilization circuit 205 generates a partial image corresponding to the determined cropped region. If the electronic image stabilization is to be executed, this partial image is an stabilized image.

Figure 4:
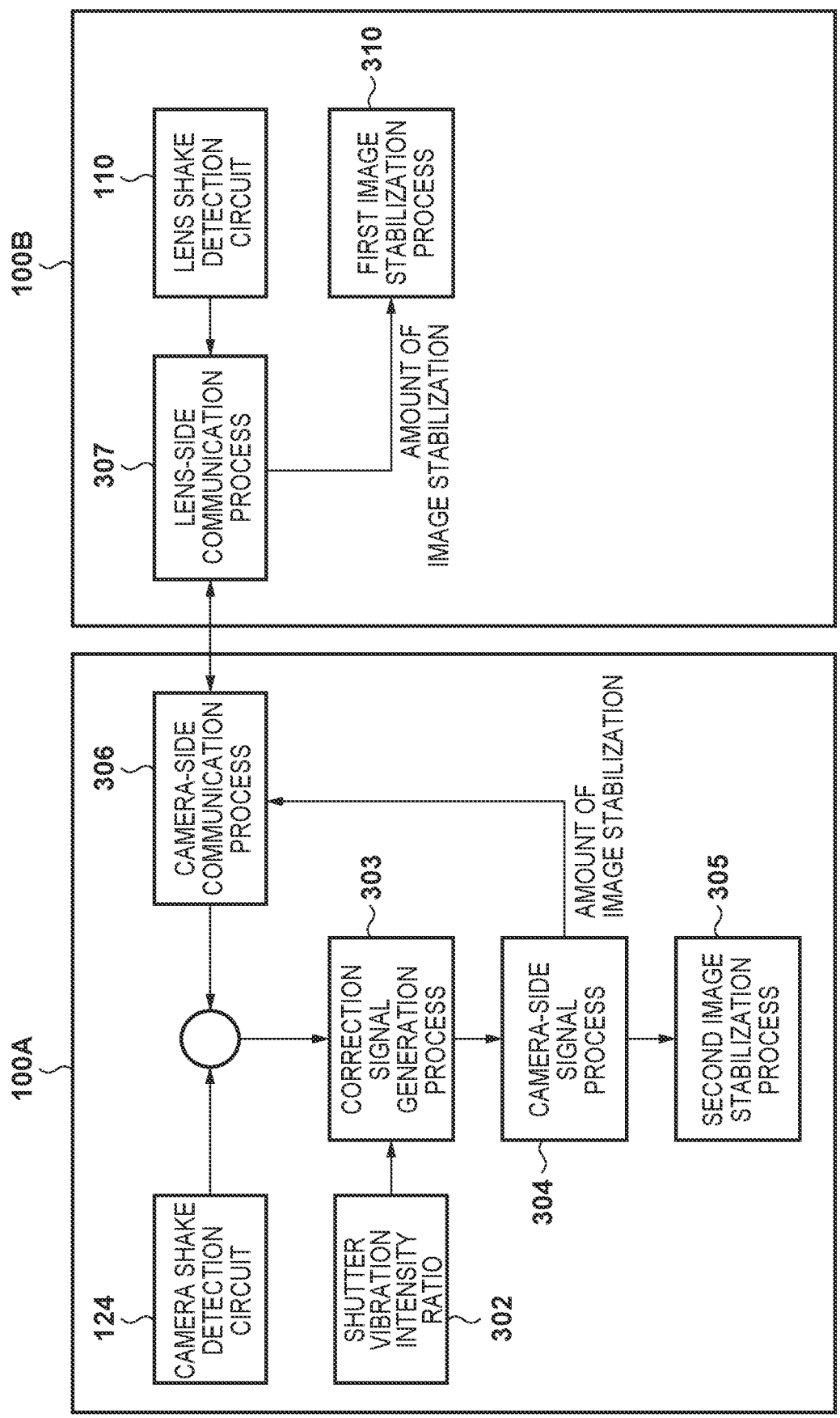
FIG. 4 is a block diagram schematically illustrating a correction signal generation process.

FIG. 4 is a block diagram schematically illustrating processes performed by the camera control circuit 126 and the lens control circuit 111 to detect motion of the digital camera 100 caused by a shutter operation. In FIG. 4, the camera control circuit 126 and the lens control circuit 111 perform a camera-side signal process and a lens-side signal process, respectively, using other structural components as necessary.

The camera control circuit 126 (the image stabilization target generation circuit 203) is configured to buffer, in the RAM, the output signal of the camera shake detection circuit 124 for the most-recent predetermined period of time in the shooting mode, for example. Moreover, the lens control circuit 111 may also be configured to buffer, in the RAM, the output signal of the lens shake detection circuit 110 for the most-recent predetermined period of time.

Upon detecting activation of the SW2 of the shutter button of the camera operation member 123, the camera control circuit 126 requests the lens control circuit 111 to transmit the output signal of the lens shake detection circuit 110, through a camera-side communication process 306 performed using the camera communication circuit 127. Upon receiving the request from the camera control circuit 126 as per a lens-side communication process 307 performed using the lens communication circuit 112, the lens control circuit 111 starts transmitting the output signal of the lens shake detection circuit 110 to the camera body 100A. This corresponds to the operation performed by the image stabilization target generation circuit 203 to acquire the output signal of the lens shake detection circuit 110 via the communication circuit 206 in FIG. 3.

Here, the operation of the front curtain of the shutter that influences image stabilization starts at the beginning of an exposure time. Thus, the lens control circuit 111 may be configured to end the transmission of the output signal of the lens shake detection circuit 110 after a predetermined set period of time long enough for the motion caused by the operation of the front curtain of the shutter to cease after receiving the request from the camera control circuit 126.

Correction Signal Generation Process 303

The camera control circuit 126 (the image stabilization target generation circuit 203) functioning as a signal correction circuit subtracts the output signal of the lens shake detection control 110 received from the lens control circuit 111 from the output signal of the camera shake detection circuit 124. As a result, a hand shake component contained in the output signal is compensated for, and a shutter shock component is extracted.

The extracted component is the difference between the shutter shock component detected by the camera shake detection circuit 124 and the shutter shock component detected by the lens shake detection circuit 110. Thus, the camera control circuit 126 (the image stabilization target generation circuit 203) adjusts the level of the signal obtained through the subtraction to an original level. For the level adjustment in the present example, the camera control circuit 126 (the image stabilization target generation circuit 203) applies, to the extracted shutter shock component, a gain corresponding to a shutter vibration intensity ratio 302 previously measured and stored in the ROM. The shutter vibration intensity ratio 302 is determined based on a ratio between magnitude of motion detected by the camera shake detection circuit 124 and magnitude of motion detected by the lens shake detection circuit 110 when no hand shake occurs during the shutter operation. The shutter vibration intensity ratio 302 may be determined at the time of manufacturing and stored in the ROM of the camera control circuit 126, for example. However, as described later, estimation accuracy of the shutter shock component can be increased by using the shutter vibration intensity ratio determined (measured) in a state where the lens unit to be used in shooting is attached.

As a result of using the shutter vibration intensity ratio 302, signals (the correction signals) that correct (eliminate or reduce) the shutter shock components of the output signals of the camera shake detection circuit 124 and the lens shake detection circuit 110 can be generated. Then, the output signal of the camera shake detection circuit 124 is corrected by subtracting the correction signal from this output signal. As a result, the influence of the shutter shock on the output signal of the camera shake detection circuit 124 is reduced. This enhances the accuracy of image stabilization based on the output signal of the camera shake detection circuit 124. Moreover, the output signal of the lens shake detection circuit 110 can also be corrected in the same manner. The camera control circuit 126 (the image stabilization target generation circuit 203) stores the correction signals generated using the shutter vibration intensity ratio 302 in the RAM, for example.

The correction signal generation process may be executed in response to an instruction from the user, separately from the image stabilization process. Furthermore, the correction signal generation process may be automatically executed when still image shooting is performed for the first time after detection of replacement of the lens unit.

Camera-Side Signal Process 304

For still image shooting, the camera control circuit 126 (the image stabilization target generation circuit 203) subtracts the correction signal stored in the RAM from the output signal of the camera shake detection circuit 124 to reduce the motion component caused by the shutter operation in the output signal. Then, the camera control circuit 126 (the image stabilization target generation circuit 203) calculates the target value for image stabilization based on the corrected output signal. Here, when no shutter vibration signal is stored in the RAM, the correction signal previously measured and stored in the ROM at the time of manufacturing may be used, or the output signal of the camera shake detection circuit 124 may not be corrected, for example. Then, the camera control circuit 126 (the cooperative control arithmetic circuit 204) combines the combination of the first and second image stabilization operations and calculates the image stabilization amount for realizing the target value for image stabilization. The camera control circuit 126 (the cooperative control arithmetic circuit 204) transmits the image stabilization amount for the first image stabilization operation taken from the calculated image stabilization amount, to the lens unit 100B using the camera-side communication process 306 performed by the lens communication circuit 112.

Second Image Stabilization Process 305

The camera control circuit 126 and the imaging-surface stabilization circuit 116 drive the image sensor of the image capture circuit 115 based on the image stabilization amount for the second image stabilization operation out of the image stabilization amount calculated in the camera-side signal process 304, and stabilize blurring. This corresponds to the operation performed by the second image stabilization unit described with reference to FIG. 3.

First Image Stabilization Process 310

On the other hand, the lens control circuit 111 receives the image stabilization amount from the camera body 100A through the lens-side communication process 307 performed by the lens communication circuit 112. Then, the lens control circuit 111 drives the correction lens based on the image stabilization amount via the optical image stabilization circuit 106 to correct blur. This corresponds to the operation performed by the first image stabilization unit described with reference to FIG. 3.

Description of Correction Signal Generation Process

Figure 5:
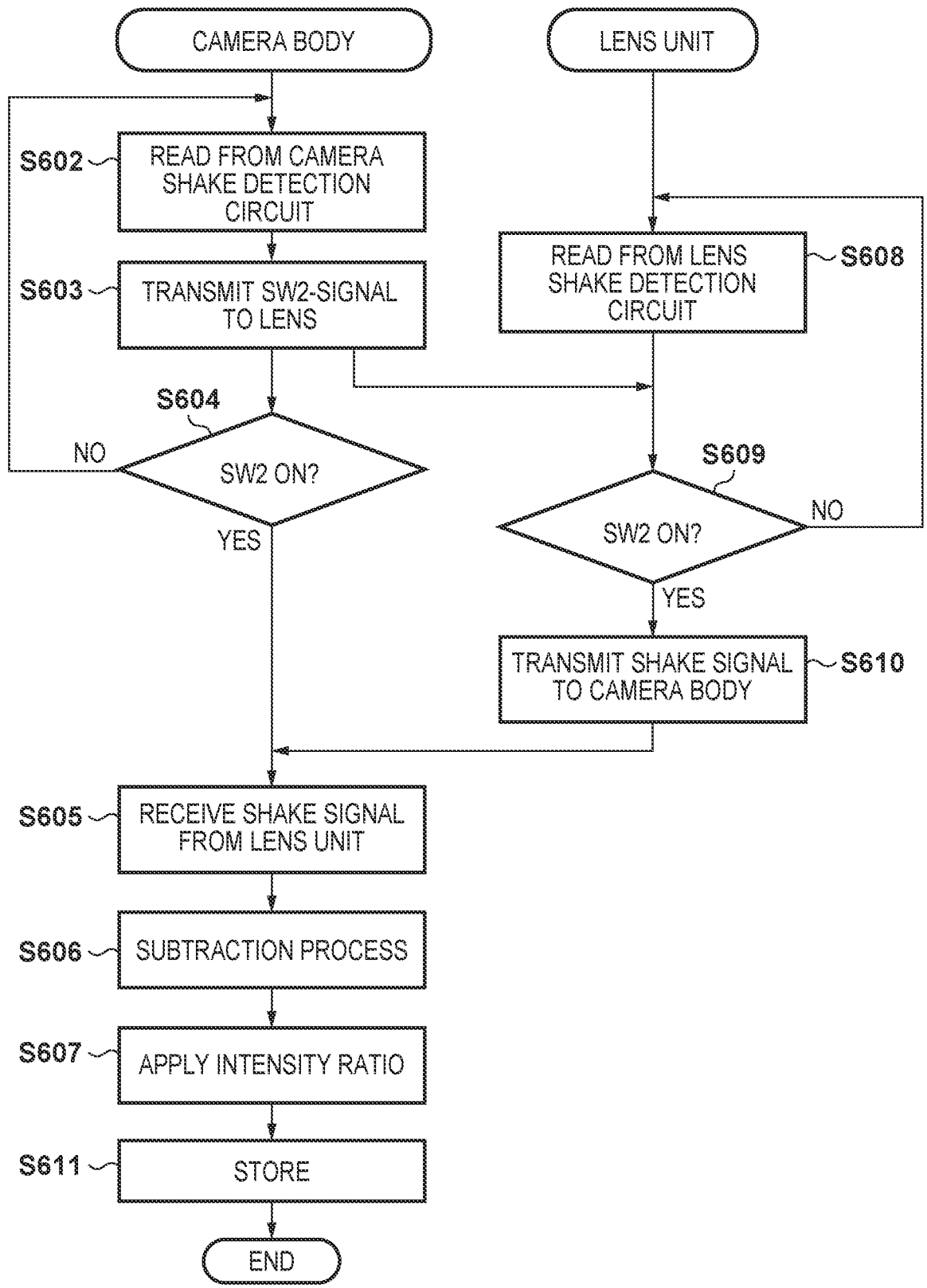
FIG. 5 is a flowchart of the correction signal generation process.

FIG. 5 is a flowchart that indicates the operations performed in the camera body and the lens unit, and the signals exchanged therebetween, according to the aforementioned correction signal generation process.

In step S602, the camera control circuit 126 starts acquiring the output signal of the camera shake detection circuit 124. At the same time, the lens control circuit 111 starts acquiring the output signal of the lens shake detection circuit 110 in step S608.

In step S603, the camera control circuit 126 detects the state of the SW2 of the shutter button and transmits the detected state to the lens unit 100B. When the SW2 is OFF, the camera control circuit 126 may not transmit the detected state. Activation of the SW2 of the shutter button corresponds to an instruction to start still image shooting.

In step S604, the camera control circuit 126 determines whether the SW2 of the shutter button is ON. If it is determined that the SW2 is ON, the camera control circuit 126 proceeds to step S605. If not, the camera control circuit 126 returns to step S602 to continue acquiring the output signal.

In step S609, the lens control circuit 111 determines whether a notification that the SW2 of the shutter button is ON has been received from the camera body 100A. If it is determined that the notification has been received, the lens control circuit 111 proceeds to step S610. If not, the lens control circuit 111 returns to step S608 to continue acquiring the output signal.

In step S610, the lens control circuit 111 starts transmitting the output signal of the lens shake detection circuit 110 to the camera body 100A.

In step S605, the camera control circuit 126 starts receiving the output signal of the lens shake detection circuit 110 from the lens control circuit 111. The camera control circuit 126 stores the received signal in the RAM, for example.

The acquiring of the output signals from the camera shake detection circuit 124 and the lens shake detection circuit 110 is continued until a predetermined period of time has elapsed from when the processes proceed to steps S605 and S610. This predetermined period of time is determined in advance, and is long enough for the motion of the camera caused by the operation of the front curtain of the shutter to cease.

In step S606, the camera control circuit 126 subtracts the output signal of the lens shake detection circuit 110 from the output signal of the camera shake detection circuit 124, and stores the obtained difference signal in the RAM. Here, the camera control circuit 126 synchronizes the timings of the two output signals to perform this subtraction. This timing synchronization is realized by taking the sampling frequencies of the output signals, the length of time required for communication between the camera body 100A and the lens unit 100B, and the like into consideration. Alternatively, the timing synchronization may be performed using a well-known method, such as a method using timings of characteristic points of the output signals.

In S607, the camera control circuit 126 applies the aforementioned intensity ratio to the difference signal to generate the correction signal of the shutter shock component. Then, in step S608, the camera control circuit 126 stores the correction signal in the RAM, for example. Moreover, the correction signal or the difference signal before the application of the intensity ratio may be stored in the ROM in association with unique information regarding the lens unit 100B.

According to the present embodiment, motion of the image capture apparatus caused by an operation of the vibration source included in the image capture apparatus can be accurately detected using the output signals of the two different image stabilization units that are at different distances from the vibration source. This enabled motion of the image capture apparatus caused by hand shake to be accurately detected, and thus enhances the accuracy of image stabilization. Moreover, the configuration according to the present embodiment can reflect replacement of the lens unit and changes in the structural components of the image capture apparatus over time and thus detect motion of the image capture apparatus in accordance with a usage environment at the time of shooting. Hence, as compared to a configuration that simply keeps using the motion detected at the time of manufacturing, for example, the configuration according to the present embodiment can accurately reduce the motion component contained in the detected motion of the image capture apparatus and caused by an operation of the vibration source.

Second Embodiment

Next, the second embodiment according to the present invention is described. The present embodiment relates to the correction signal generation process, which is described in the first embodiment, executed when still image shooting is performed for the first time after a lens unit is replaced.

Figure 6:
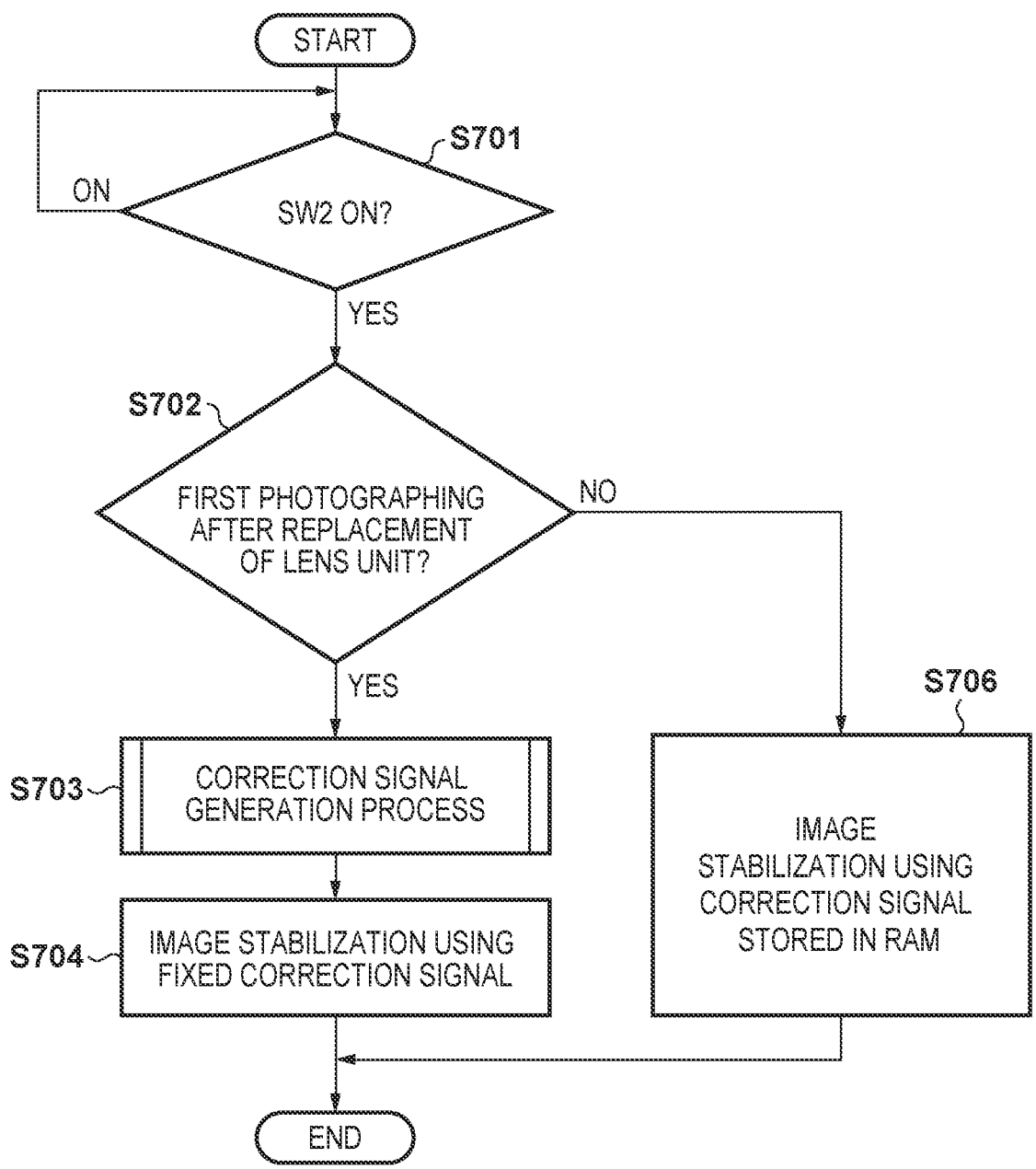
FIG. 6 is a flowchart according to a second embodiment.

FIG. 6 is a flowchart of an operation performed by a digital camera 100 according to the present embodiment. In FIG. 6, illustration of operations including shooting that are not directly related to the correction signal generation process is omitted.

In step S701, a camera control circuit 126 determines whether an SW2 of a shutter button is ON, that is, whether an instruction to perform still image shooting has been received. If it is determined that the SW2 is ON, the camera control circuit 126 proceeds to step S702. If not, the camera control circuit 126 executes step S701 again.

In step S702, the camera control circuit 126 determines whether still image shooting is performed for the first time after replacement of the lens unit. The camera control circuit 126 detects the replacement of the lens unit by, for example, monitoring a contact of a lens mount or communication with a lens control circuit 111. If it is determined that the lens unit has been replaced, the camera control circuit 126 stores a lens replacement flag in a RAM and then deletes the lens replacement flag after still image shooting is performed, for example. Thus, if the lens replacement flag stored in the RAM is detected in this determination process in step S702, the camera control circuit 126 determines that still image shooting is performed for the first time after the replacement of the lens unit. Here, the determination process in step S702 may be realized by a different method. If it is determined that still image shooting is performed for the first time after the replacement of the lens unit, the camera control circuit 126 proceeds to step S703. If not, the camera control circuit 126 proceeds to step S706.

In step S703, the camera control circuit 126 and the lens control circuit 111 execute the correction signal generation process described with reference to the flowchart of FIG. 5.

In step S704, the camera control circuit 126 executes an image stabilization process using a fixed correction signal (such as a correction signal generated at the time of manufacture) stored in a ROM, for example.

In step S706, the camera control circuit 126 executes the image stabilization process using the correction signal generated and stored in the RAM in step S705.

According to the present embodiment, the correction signal is generated when still image shooting is performed for the first time after replacement of the lens unit (that is, a vibration source performs an operation for the first time after the replacement of the lens unit). Thus, for still image shooting performed for the second or subsequent time, the correction signal reflecting the attaching of the replaced lens unit and the camera body to each other can be used. This enhances the accuracy of image stabilization. Moreover, the generated correction signal may be stored in association with unique information on the lens unit and then used when this same lens unit is attached again. This can realize accurate image stabilization even when still image shooting is performed for the first time after the same lens unit is attached again.

Variation

It should be noted that the correction signal may be generated whenever still image shooting is performed, instead of only when still image shooting is performed for the first time after replacement of the lens unit. In this case, extraction of the shutter shock component and generation of the correction signal are executed in parallel with correction of the output signal using the stored correction signal and image stabilization. According to the present variation, the correction signal generated in the most recent shooting operation is used for still image shooting performed for the third or subsequent time. Thus, it can be expected that the accuracy of correcting the output signal of the image stabilization unit will be enhanced.

To update the previous correction signal generated in the most recent shooting operation using the current correction signal, the previous correction signal may be replaced with an averaged correction signal, instead of simply replacing it with the current correction signal. With this, a correction signal in which the influence of noise is suppressed can be obtained.

Figure 7:
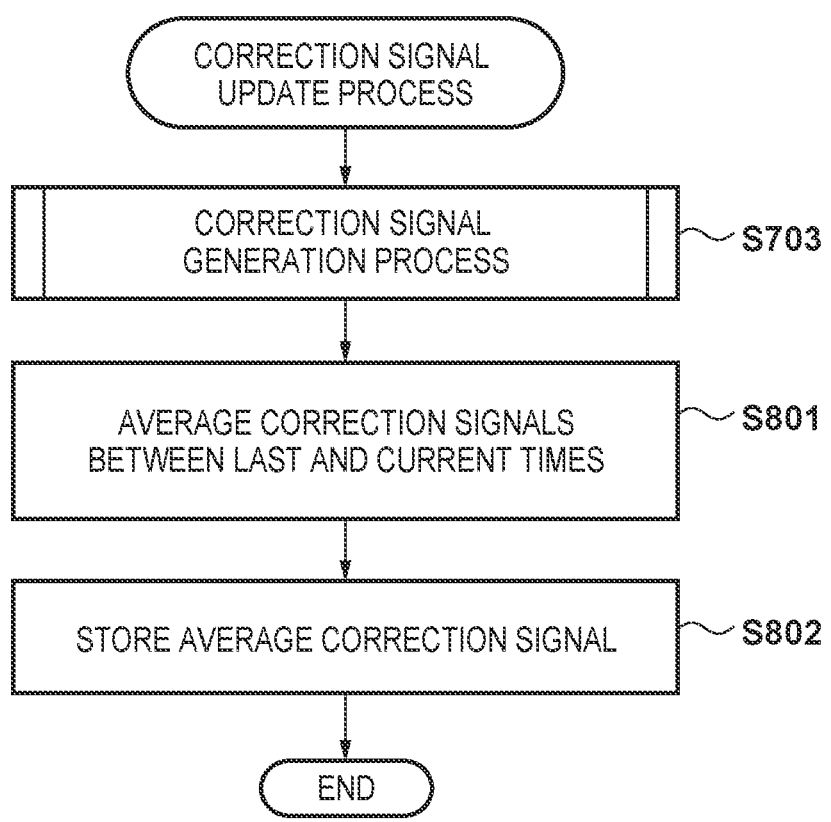
FIG. 7 is a flowchart according to a variation of the second embodiment.

FIG. 7 is a flowchart of the operation of updating the correction signal using the average correction signal.

In step S703, the aforementioned correction signal generation process is executed.

In step S801, the camera control circuit 126 generates a signal by averaging the previously generated correction signal and stored in the RAM and the correction signal generated this time in step S703.

In step S802, the camera control circuit 126 updates the correction signal stored in the RAM using the average correction signal generated in step S801.

Third Embodiment

Next, the third embodiment according to the present invention is described. In the first embodiment, the image stabilization amount on the lens-unit side is determined by the camera body 100A (the cooperative control arithmetic circuit 204) and transmitted to the lens unit 100B. On the other hand, in the present embodiment, a lens unit calculates an image stabilization amount and executes image stabilization independent of a camera body 100A.

Figure 8:
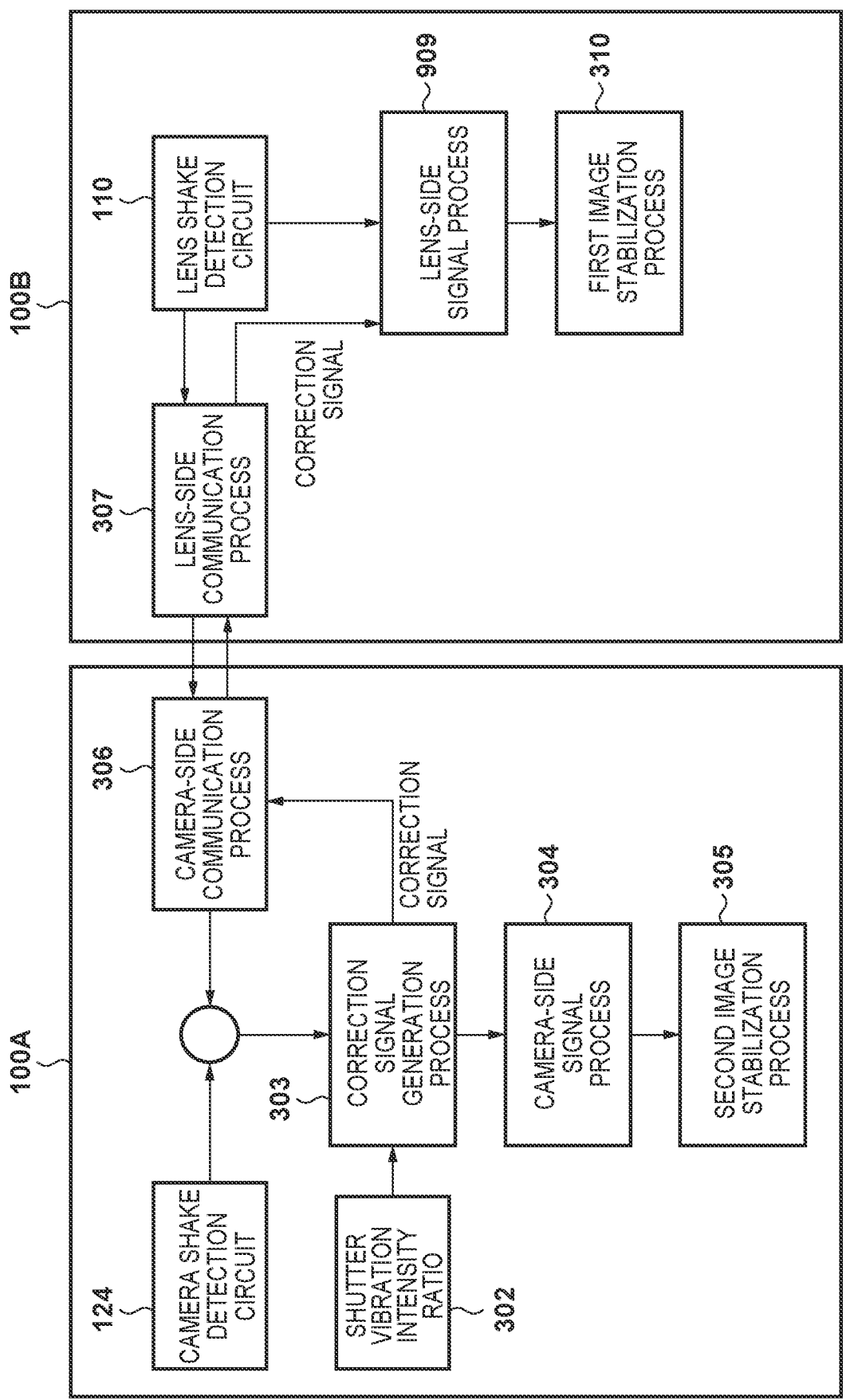
FIG. 8 is a block diagram according to a third embodiment.
Figure 9:
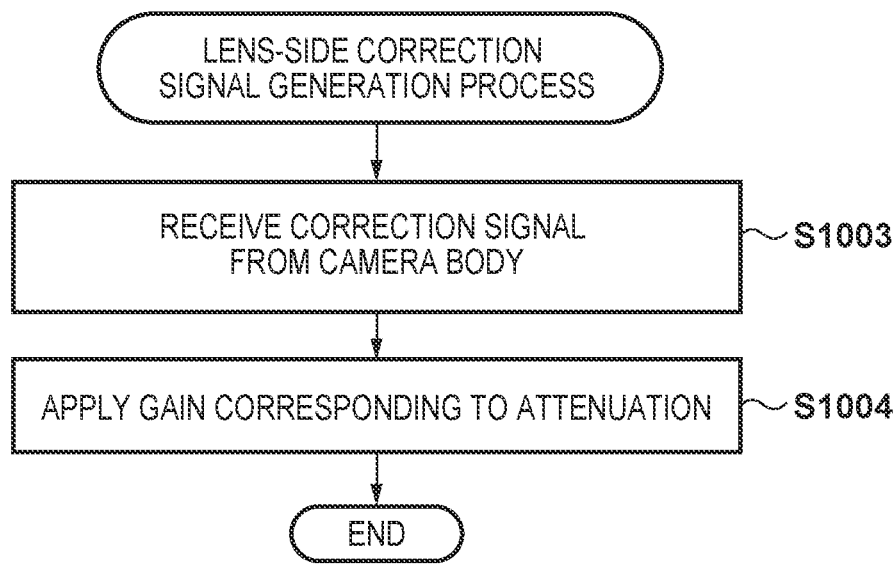
FIG. 9 is a flowchart according to the third embodiment.

FIG. 8 is a block diagram schematically illustrating processes performed by a camera control circuit 126 and a lens control circuit 111 to detect motion of a digital camera 100 caused by a shutter operation, according to the present embodiment. FIG. 9 is a flowchart of an operation of the lens control circuit 111 according to the present embodiment. In FIG. 8, the same processes and structural components as those in the first embodiment are assigned the same reference numerals as in FIG. 4, and description of these processes and structural components is omitted here. The following mainly describes differences between the first embodiment and the present embodiment.

In the present embodiment, the camera control circuit 126 transmits a correction signal generated in a correction signal generation process 303 to a lens unit 100B, instead of transmitting an image stabilization amount determined in a camera-side signal process 304.

Lens-Side Signal Process 909

In step S1003, the lens control circuit 111 receives the correction signal from the camera body 100A.

This correction signal is used for correcting an output signal of a camera shake detection circuit 124. Thus, in step S1004, the lens control circuit 111 adjusts the level of the received correction signal to generate a correction signal for correcting an output signal of a lens shake detection circuit 110. Here, shutter vibration is transmitted from the camera body 100A to the lens unit 100B and detected by the lens shake detection circuit 110. During this period, the shutter vibration attenuates, and thus the lens control circuit 111 adjusts the level of the received signal by applying a gain corresponding to an amount of this attenuation of shutter vibration. Then, the lens control circuit 111 stores the level-adjusted correction signal as the correction signal for the lens shake detection circuit 110 in a RAM, for example.

The aforementioned gain may be stored in a ROM of the lens control circuit 111 in advance. Alternatively, for subtraction between the output signals in the correction signal generation process, the camera control circuit 126 may detect peak levels of the output signals and transmit a ratio between the peak levels as an attenuation rate, together with the correction signal, to the lens unit 100B. In this case, the lens control circuit 111 applies the received attenuation rate in step S1004. Alternatively, the camera control circuit 126 may generate the correction signal for the lens shake detection circuit 110, and transmit this correction signal instead of the correction signal for the camera shake detection circuit 124. In this case, the lens control circuit 111 uses the received correction signal as it is.

The lens control circuit 111 determines the image stabilization amount on the basis of the output signal of the lens shake detection circuit 110 corrected using the correction signal stored in the RAM.

First Image Stabilization Process 310

The lens control circuit 111 drives a correction lens via an optical image stabilization circuit 106 based on the image stabilization amount determined in the lens-side signal process 909. Then, the lens control circuit 111 executes optical image stabilization.

A camera-side signal process 304 and a second image stabilization process 305 of the camera body 100A may be the same as those in the first embodiment.

According to the present embodiment, the same advantageous effects as in the first embodiment can be realized. Moreover, processing ability on the lens-unit side can be used effectively.

Fourth Embodiment

Next, the fourth embodiment according to the present invention is described. In the embodiments described above, the shutter vibration intensity ratio 302 used in the correction signal generation process of the camera body 100A is the fixed value measured in advance. However, a shutter vibration intensity ratio 302 that can be updated enables generation of a correction signal with higher accuracy in accordance with an equipment configuration at the time of shooting.

Figure 10:
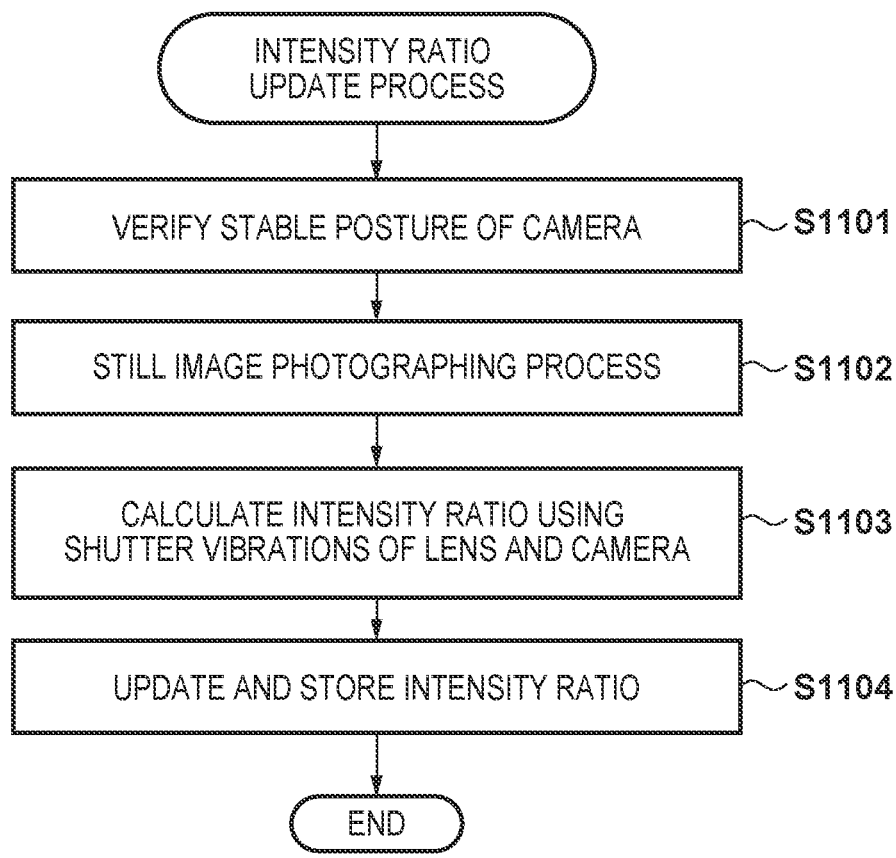
FIG. 10 is a flowchart according to a fourth embodiment.

FIG. 10 is a flowchart of an update process for the shutter vibration intensity ratio according to the present embodiment. This process may be executed by a user instruction through a menu screen, for example.

In step S1101, the camera control circuit 126 verifies that a posture of a digital camera 100 is stable, based on the output signal of the camera shake detection circuit 124, for example. When amplitude of the output signal of the camera shake detection circuit 124 is detected as being a predetermined value or less for a predetermined period of time, for example, the camera control circuit 126 determines that the posture of the digital camera 100 is stable. If it is not determined that the posture of the digital camera 100 is stable, the camera control circuit 126 may, for example, display a message on a display device 120 to issue a warning to the user. Then, the camera control circuit 126 may execute step S1101 again after a set period of time has elapsed.

If it is determined that the posture of the digital camera 100 is stable, the camera control circuit 126 executes a still image shooting process in step S1102. In this still image shooting process, exposure control or focus control do not need to be performed if only the shutter operates. The camera control circuit 126 may automatically execute the still image shooting process or the user may operate a shutter button.

In step S1103, the camera control circuit 126 acquires the output signals of the camera shake detection circuit 124 and the lens shake detection circuit 110 as in the correction signal generation process. Then, the camera control circuit 126 calculates, as an intensity ratio, a ratio of a pair of sample values having the same time of day in a shutter shock period. Here, the intensity ratio may be obtained by averaging ratios calculated using a plurality of pairs of sample values.

In step S1104, the camera control circuit 126 updates the shutter vibration intensity ratio stored in, for example, a ROM to the intensity ratio calculated in step S1103.

According to the present embodiment, updating of the shutter vibration intensity ratio used for generating the correction signal enhances the accuracy of the shutter vibration intensity ratio. This enhances the accuracy of the correction signal and thus also enhances the accuracy of image stabilization. Here, when a new correction signal is generated, the shutter vibration intensity ratio may also be updated.

In the first to fourth embodiments, detection of activation of the SW2 of the shutter button included in the operation member 123 triggers acquisition of the correction signal. However, the still image shooting process may be started by an instruction from a different component, other than the SW2 of the shutter button. More specifically, detection of the fact that another shooting instruction to start still image shooting being accepted, instead of the detection of activation of the SW2, may trigger a request for the output signal of the lens shake detection circuit 110. With this, the embodiments described above are applicable to automatic shooting, such as a process in which detection of a smile automatically starts the still image shooting process.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-113097, filed on Jun. 13, 2018, which is hereby incorporated by reference herein in its entirety.

What is claimed is:

1. An image capture apparatus comprising:
   first motion detection sensor for outputting a signal corresponding to detected motion; and
   at least one processor or circuit which functions as:
   a generation unit configured to extract a motion component caused by an operation of a vibration source included in the image capture apparatus, based on an output signal of the first motion detection sensor and an output signal of second motion detection sensor, the first motion detection sensor and the second motion detection sensor being at different distances from the vibration source;
   a signal correction unit configured to correct the output signal of the first motion detection sensor using the motion component; and
   an image stabilization control unit configured to control image stabilization based on the output signal corrected by the signal correction unit.

2. The image capture apparatus according to claim 1, wherein the vibration source is a mechanical shutter.

3. The image capture apparatus according to claim 1, wherein the generation unit extracts, as the motion component, a difference signal between the output signal of the first motion detection sensor and the output signal of the second motion detection sensor.

4. The image capture apparatus according to claim 1, wherein the generation unit stores the extracted motion component, and
   the signal correction unit corrects the output signal using the motion component stored by the generation unit.

5. The image capture apparatus according to claim 4, wherein the generation unit updates the stored motion component to a motion component obtained by averaging the stored motion component and an extracted motion component.

6. The image capture apparatus according to claim 1, wherein the second motion detection sensor is provided in a lens unit attached to the image capture apparatus.

7. The image capture apparatus according to claim 6, wherein the lens unit is detachable from the image capture apparatus.

8. The image capture apparatus according to claim 7, wherein the generation unit stores the extracted motion component, and updates the stored motion component when the lens unit is replaced.

9. The image capture apparatus according to claim 8, wherein, when the generation unit does not update the stored motion component after the lens unit is replaced, the signal correction unit uses a motion component stored in advance, instead of the motion component stored by the generation unit.

10. The image capture apparatus according to claim 1, wherein extraction of the motion component by the generation unit, correction of the output signal by the signal correction unit, and image stabilization by the image stabilization control unit are executed in parallel.

11. The image capture apparatus according to claim 1, wherein the image stabilization control unit control the image stabilization by driving at least one of a correction lens and an image sensor based on the output signal corrected by the signal correction unit.

12. The image capture apparatus according to claim 1, wherein the signal correction unit adjusts a level of the motion component to generate a first correction signal, and corrects the output signal of the first motion detection sensor using the first correction signal.

13. The image capture apparatus according to claim 1, wherein the signal generation unit further adjusts a level of the motion component to generate a second correction signal for correcting the output signal of the second motion detection sensor.

14. The image capture apparatus according to claim 13, wherein the second motion detection sensor is provided in a lens unit, and
    the image stabilization control unit includes:
    a first image stabilization control unit configured to control drive of an image sensor based on the output signal of the first motion detection sensor that is corrected by the signal correction unit; and
    a second image stabilization control unit configured to control drive of a correction lens based on the output signal of the second motion detection sensor that is corrected using the second correction signal generated by the signal correction unit.

15. The image capture apparatus according to claim 14, wherein the second image stabilization control unit is provided in the lens unit and implemented by at least one processor or circuit provided in the lens unit.

16. The image capture apparatus according to claim 12, wherein the signal correction unit adjusts the level of the motion component using a ratio based on the output signals of the first motion detection sensor and the second motion detection sensor in a state where the image capture apparatus is fixed.

17. A control method of an image capture apparatus, the method comprising:
    acquiring a signal corresponding to motion, from first motion detection sensor;
    acquiring a signal corresponding to motion, from second motion detection sensor, the first motion detection sensor and the second motion detection sensor being at different distances from a vibration source included in the image capture apparatus;
    extracting a motion component caused by an operation of the vibration source based on the signal acquired from the first motion detection sensor and the signal acquired from the second motion detection sensor;
    correcting the signal acquired from the first motion detection sensor using the motion component; and
    controlling image stabilization by driving a correction member based on the signal corrected in the correcting.

18. A non-transitory computer-readable medium storing one or more programs executable by one or more processors of an image capture apparatus, wherein the one or more programs, when executed by the one or more processors, cause the one or more processors to function as to perform a control method of an image capture apparatus comprising:
    acquiring a signal corresponding to motion, from first motion detection sensor;
    acquiring a signal corresponding to motion, from second motion detection sensor, the first motion detection sensor and the second motion detection sensor being at different distances from a vibration source included in the image capture apparatus;
    extracting a motion component caused by an operation of the vibration source based on the signal acquired from the first motion detection sensor and the signal acquired from the second motion detection sensor;

correcting the signal acquired from the first motion detection sensor using the motion component; and
controlling image stabilization by driving a correction member based on the signal corrected in the correcting.

* * * * *